Figure 1:
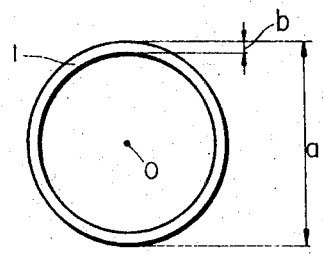

United States Patent
Kondo

[15] 3,642,601
[45] Feb. 15, 1972

[54] MACHINE FOR PROCESSING A PIECE OF WORK BY ELECTRIC CURRENT

[72] Inventor: Iwao Kondo, 39-9 Kita-machi 1-chome, Nerima-ku, Tokyo, Japan

[22] Filed: Dec. 3, 1969

[21] Appl. No.: 881,728

[30] Foreign Application Priority Data

Dec. 3, 1968 Japan..................................43/88571
Aug. 7, 1969 Japan..................................44/62026
Oct. 16, 1969 Japan..................................44/82791

[52] U.S. Cl..............................204/206, 204/212, 204/224, 204/225, 204/286
[51] Int. Cl. ........................................B01k 3/04, B23p 1/04
[58] Field of Search..................204/143 M, 143 R, 206, 212, 204/224, 225, 284–286

[56] References Cited

UNITED STATES PATENTS

Re. 26,970 10/1970 Bentley et al......................204/143 M
2,526,423 10/1950 Rudorff..........................204/143 M X
3,511,767 5/1970 Williams................................204/284
3,479,479 11/1969 O'Connor......................204/143 M X Primary Examiner—John H. Mack
Assistant Examiner—D. R. Valentine
Attorney—Waters, Roditi, Schwartz & Nissen

[57] ABSTRACT

A device for processing a workpiece by electric current, comprising an electrode carried by an electrode holder, and a work holder holding the work stationary. The electrode holder moves the electrode relative to the workpiece, while providing electric current therethrough, preferably in three directions. The electrode holder also moves the electrode relative to the holder itself, so as to bring fresh portions of the electrode into operative contact with the work. For electrolytic processing, the electrode includes a means for continuously ejecting electrolyte to the working area.

6 Claims, 11 Drawing Figures

SHEET 1 OF 4

PATENTED FEB 15 1972 3,642,601
SHEET 4 OF 4

MACHINE FOR PROCESSING A PIECE OF WORK BY ELECTRIC CURRENT

This invention relates to a device for processing a workpiece by electric current, and more particularly to a device which applies a periodically varying voltage across a processing electrode and a workpiece to be processed, so as to process the workpiece by electrolytic current or a discharge current through the workpiece. The process which can be carried out by the device of the invention includes perforation, shaping, cutting, grinding, and the like.

There are known devices for processing a workpiece by electric current, but the known devices have the shortcoming that the devices include electrodes which are consumed as the workpieces are processed. Accordingly, as the electrodes are consumed by repeated operations of the device, the accuracy of the processing is inevitably impaired. In order to minimize the consumption of the electrode, it has been proposed to use current pulses of long duration, e.g., 100 $\mu$sec. (microseconds) to several msec. (milliseconds), in the case of processing with discharge currents. With such pulse currents, the consumption of the electrode can be reduced to 1 to 10 percent of that of conventional process, but the roughness of the finished work is limited to the order of 10 $\mu H_{max}$, and the consumption of corners of the electrode cannot be avoided. It is extremely difficult to completely eliminate the consumption of the electrode.

In view of the presence of such inevitable consumption of the electrodes, it has been a practice to prepare two kinds of electrodes; namely, electrodes for rough processing, and electrodes for finishing. The use of the two kinds of electrodes necessitates the replacement of the electrodes in processing a workpiece, which requires additional time and labor. The preparation or stock of the two kinds of electrodes also results in an increase of the cost of processing. In addition, the replacement of the electrodes may cause a change in the relative position of the electrode with respect to the workpiece, and the accuracy of the process may be impaired.

On the other hand, the electrolytic process is different from the discharging process in that the electrodes are not consumed in the former, so that there is no need for replacement or rotation of the electrode in the electrolytic process. The electrolytic process, however, needs a means for providing a sufficient amount of electrolyte at a comparatively high pressure, e.g., aqueous solution of sodium chloride or sodium nitrite.

Therefore, an object of the present invention is to provide an improved device for the aforesaid processing, which obviates the said difficulties of the conventional devices. A device for processing a workpiece by electric current, according to the present invention, uses a ring-shaped (or linear) electrode, in order to achieve an improvement in dimensional accuracy and in the interchangeability of the electrode. With the device of the invention, quick correction can easily be made for electrode consumption, by rotating the electrode.

Another object of the present invention is to provide a device for processing a workpiece by electric current, which can easily be used as a three-dimensional shaper, by incorporating a spindle for holding a ring-shaped (or linear) electrode while allowing three-dimensional movement of the electrode relative to the work, i.e., along X-, Y-, and Z-axes of the Cartesian coordinates.

Another object of the present invention is to provide a device of the aforesaid type, which does not produce any troublesome waste from cutoff portions of the work, as in the case of conventional devices, but produces solid chips, so as to considerably improve the efficiency of the process.

A still further object of the present invention is to provide an improved device for processing a workpiece by electric current, which can be used as an electrolytic processing device with an improved electrode.

Figure 2:
Figure 3:
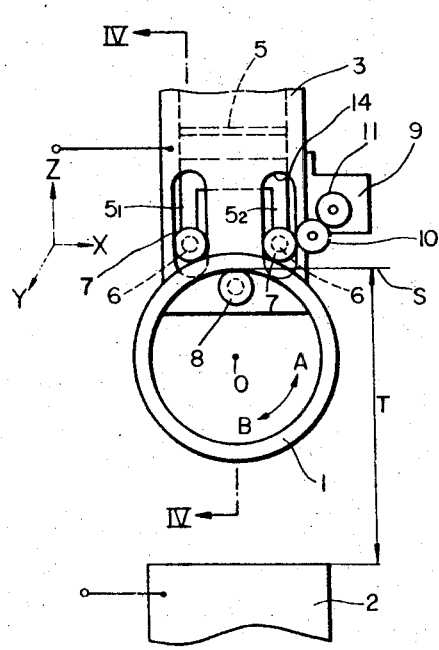
Figure 4:
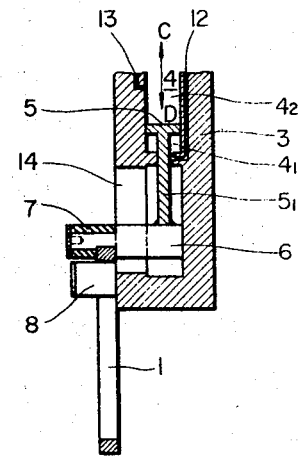
Figure 5:
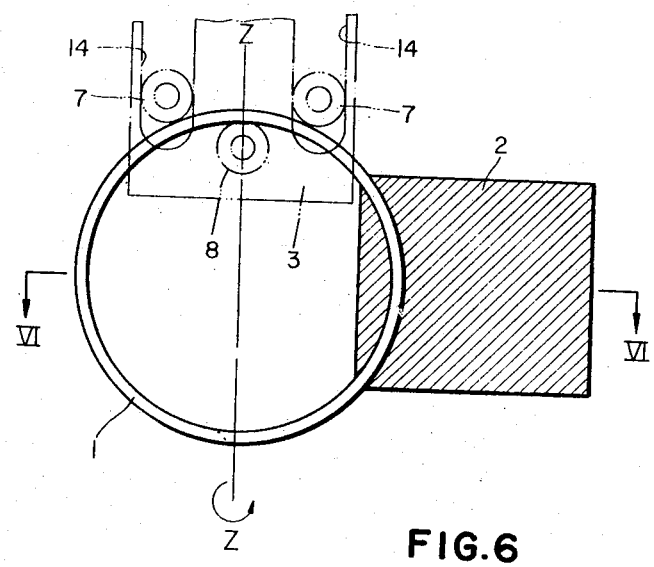
Figure 6:
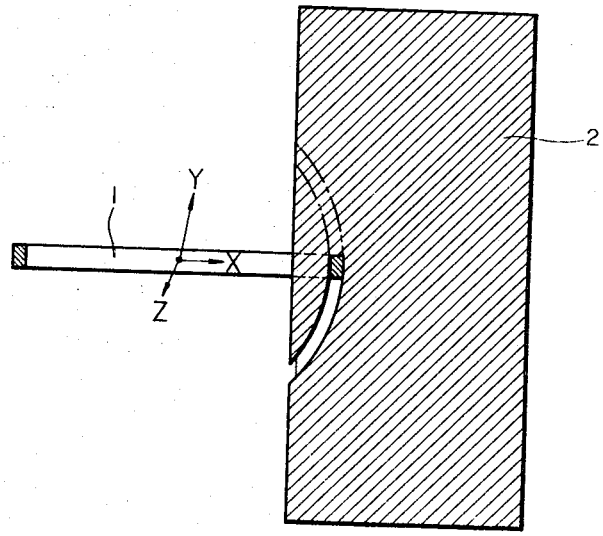
Figure 7:
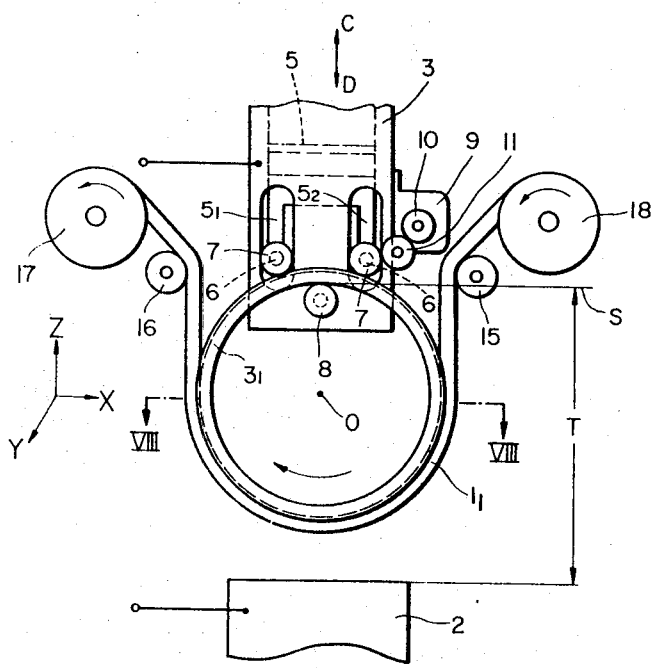
Figure 8:
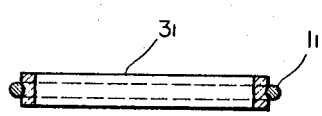
Figure 9:
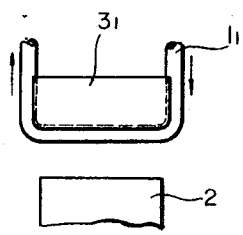
Figure 10:
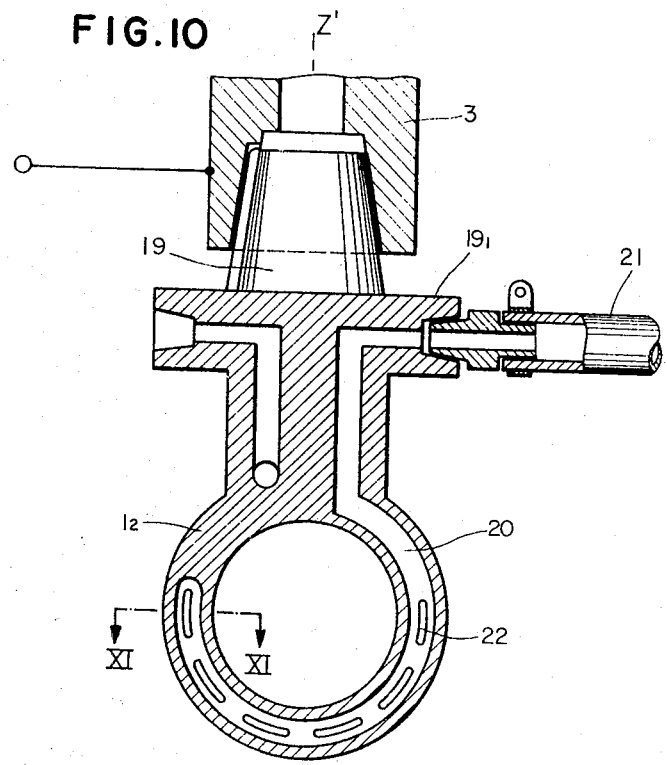
Figure 11:
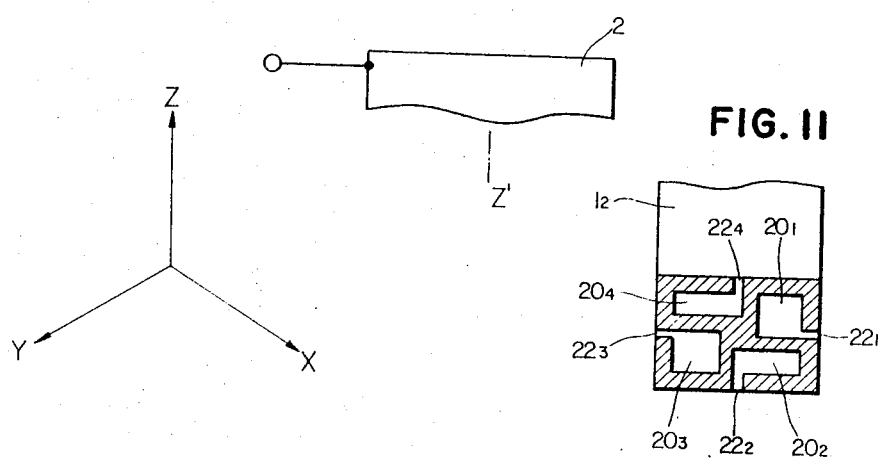

Other objects and advantages of the present invention may be appreciated by referring to the following description, taken in conjunction with the accompanying drawings, in which:

FIG. 1 is an elevation view of an electrode usable in the device embodying the present invention;
FIG. 2 is a vertical sectional view of the electrode;
FIG. 3 is an elevation view of an electrode holder usable in the device of the present invention;
FIG. 4 is a sectional view, taken along line IV—IV in FIG. 3;
FIG. 5 is a diagrammatic illustration of the manner in which a workpiece is processed by a device, according to present invention;
FIG. 6 is a sectional view, taken along the line VI—VI in FIG. 5;
FIG. 7 is an elevation view of an electrode, which is incorporated in another embodiment of the present invention;
FIG. 8 is a sectional view, taken along line VIII—VIII in FIG. 7;
FIG. 9 is an elevation view of a guide member of a linear electrode usable in an embodiment of the present invention;
FIG. 10 is an elevation view of an electrolytic electrode and an electrode holder in a different embodiment of the present invention; and
FIG. 11 is an enlarged sectional view, taken along line XI—XI in FIG. 10.

Like parts are designated by like numerals and symbols throughout the accompanying drawings.

Referring to FIGS. 1 to 6, especially FIGS. 1 and 2, a ring-shaped electrode 1 is made in the form of a true circle with a circular or rectangular cross section. Due to the simple construction, the ring-shaped electrode 1 can easily be manufactured on mass-production basis, with high dimensional accuracy with respect to the overall outer diameter $a$, the radial thickness $b$, and the axial width $c$. Various common electrode materials can be used for the manufacture of the ring-shaped electrode 1, such as steel, copper, brass, aluminum, silver-tungsten, copper-tungsten, graphite, and other conductive material including electrically conductive synthetic resins. It is an important feature of the ring-shaped electrode 1 that when the electrode is partially consumed or roughened in the process of processing a workpiece 2, a fresh portion of the electrode can easily be brought into an operating part of the device, which is facing the workpiece 2, in lieu of the thus consumed or roughened portion, simply by turning the ring-shaped electrode about its axis, as shown by the arrow $\overline{AB}$ of FIG. 3.

The simple configuration of the ring-shaped electrode 1 also provides for simple and quick replacement of the electrode to and from the processing device, as compared with known electrodes requiring fastening male screws cooperating with mating parts of an electrode holder. The ring-shaped electrode 1 is particularly advantageous for automatic mounting and dismounting. In the illustrated embodiment, a roll 8 engages the inner peripheral surface of the ring-shaped electrode 1 at the uppermost level thereon. The uppermost point of the roll 8 is used as a fixed reference point, so that a constant distance can be maintained between the electrode 1 and the work 2, regardless of the angular position of the electrode 1, relative to the roll 8. Thereby, a high accuracy of the process can be ensured. For instance, by using a ring-shaped electrode 1 with a rectangular cross section, a highly accurate groove can easily be formed.

FIGS. 3 and 4 illustrate a discharge-processing device, according to the present invention. An electrode holder 3 includes a cylinder 4 for receiving a hydraulically actuated piston 5 therein. The piston 5 has a pair of downwardly extending piston rods $5_1$ and $5_2$, and a lateral shaft 6 is secured to the lower end of each of the piston rods, so as to extend in the direction of the Y-axis, as can be seen in FIG. 3. A pair of resilient rolls 7, which are made of suitable metal, rubber, or synthetic resin, are mounted on the shafts 6, respectively. A third roll 8 is disposed below the line connecting the centers of the rolls 7. The center of the roll 8 lies on a vertical line bisecting to the aforesaid line connecting the centers of the two rolls 7. A ring-shaped electrode 1 of the aforesaid construction is rotatably held between the two rolls 7 and the third roll 8. One of the rolls 7 is driven by a motor 9 through a pair of idlers 10, 11, so as to drive the ring-shaped electrode 1 in either direction about the axis thereof, as shown by the arrow $\overline{AB}$ of FIG. 3.

In the processing device, with the aforesaid construction, according to the present invention, in order to replace the ring-shaped electrode 1, high-pressure fluid is delivered to a lower cylinder chamber $4_1$ below the piston 5 through a passage 12, by a hydraulic control means (not shown). Thereby, the piston 5 moves upward, as shown by the arrow C of FIG. 4. The electrode holder 3 has a pair of guide slots 14 for guiding the vertical reciprocation of the piston 5 by the engagement with the rolls 7 secured to the piston 5 through the piston rods $5_1$ and $5_2$. As a result, the distance between the rolls 7 and the third roll 8 increases, to allow the removal of the ring-shaped electrode 1 by a suitable auxiliary tool (not shown). After mounting a new ring-shaped electrode 1 on the third roll 8, high-pressure fluid can be delivered to an upper cylinder chamber $4_2$ through another passage 13, so as to lower the piston 5 for securely holding the new ring-shaped electrode 1 between the rolls 7 and the third roll 8, in a rotatable manner.

Then, the electrode holder 3 is vertically driven by a suitable driving means (not shown), to properly register the ring-shaped electrode 1 with respect to a workpiece 2, for processing the latter. As the work 2 is processed, if the electrode 1 is so consumed as to impair the accurate processing, a fresh surface of the ring-shaped electrode 1 can be brought into operative engagement with the workpiece 2 by driving the former by the motor 9 through the two idlers 10, 11 and one of the rolls 7.

FIG. 5 and 6 illustrate a milling machine, according to the present invention. An electrode holder 3, similar to that as shown in FIGS. 3 and 4, rotates about the Z-axis, as can be seen in FIG. 6, so as to arcuately cut the surface of a workpiece 2. As compared with a conventional end mill, the illustrated milling machine is more efficient, because the latter cuts along a groove. Furthermore, the illustrated milling machine produces less waste, as compared with a conventional end mill.

In the device of FIG. 6, if the tiring-shaped electrode 1 is moved vertically along the Y-axis, together with the electrode holder 3, a curved surface can be formed on the workpiece 2. In addition, if the electrode holder 3 is driven in three directions, i.e., along X-, Y-, and Z-axes, by a suitable profile or digital control means (not shown), a fully automatic milling machine is provided, which is capable of three-dimensional discharge current processing. In the case of the processing with rotation of the ring-shaped electrode, electric discharge takes place from the entire surface of the electrode, causing the consumption of the inner surface of the ring-shaped electrode, which acts as a reference face. Accordingly, for some applications, automatic replacement of the electrode with a fresh electrode may be necessary to effect accurate finishing.

FIGS. 7 to 9 illustrate another embodiment of the present invention. Instead of the ring-shaped electrode 1 of the preceding embodiments, a liner electrode $1_1$ is extended along a guide member $3_1$ so as to face a workpiece 2. A fresh portion of the electrode $1_1$ can be easily automatically fed to the guide member $3_1$, as it is consumed by processing the workpiece 2. In this embodiment, the shape of the guide member $3_1$ can be modified, depending on the desired configuration of the finished form of the workpiece 2, such as arcuate or rectangular. In response to the movement of the electrode guide member $3_1$ of the electrode holder 3, the linear electrode $1_1$ also moves relative to the workpiece 2 for processing the latter.

The cross section of the linear electrode $1_1$ can be rectangular, triangular, or elliptical, and it can be made of the same material as described hereinbefore, referring to FIGS. 1 and 2. With such linear electrode $1_1$, very accurate processing can be applied to the work 2, because a fresh surface of the electrode can be always brought into operative contact with the work 2, by automatically feeding the electrode $1_1$ to the electrode guide member $3_1$ in the aforesaid manner.

The uppermost point S of a roll 8, which rotatably holds the electrode guide member $3_1$ together with a pair of cooperating rolls 7, can be used as a reference for establishing the distance T between the point S and the working surface of the workpiece 2. With such distance T being accurately controlled, precision processing can be applied to the work 2.

By using a linear electrode $1_1$ with a rectangular cross section, an accurate groove can be formed in the workpiece 2. Similarly, an accurate V-shaped groove can be formed by using a linear electrode $1_1$ with a triangular cross section.

In FIG. 7, the electrode guide member $3_1$ of the electrode holder 3 also acts as a part of the electrode $1_1$ during the active processing operation by carrying electric current therethrough. The overall configuration of the electrode guide member $3_1$ can be circular, U-shaped, or elliptical, depending on the application. If a circular electrode guide member $3_1$ is used, it can be rotated about the axis O thereof, by holding it between two rolls 7 and the roll 8, while driving one of the rolls 7 by a motor 9 through idlers 10 and 11, as in the case of the preceding embodiment. The linear electrode $1_1$ is fed from a feed reel 18 to a takeup reel 17 along a guide roll 15, the guide member $3_1$, and another guide roll 16. The two rolls 7 can be vertically reciprocated, by a hydraulic means (not shown), in a similar manner to the last-mentioned embodiment. The mechanism for driving noncircular electrode guide member $3_1$ is apparent to those skilled in the art, and no details of such mechanism will be dealt with here.

In the processing device of FIG. 7, the electrode guide member $3_1$ (also acting as a part of the electrode) can easily be replaced by a hydraulic control means (not shown). The rolls 7 are raised, in the direction of the arrow c, by moving a piston 5 carrying the rolls, by delivering high-pressure fluid to the lower side (the chamber $4_1$ in FIG. 4) of the piston 5 through a passage (12 in FIG. 4). After the rolls 7 are raised along guide slots 14, to increase the distance between the rolls 7 and the third roll 8, the electrode guide member $3_1$ can be removed and a new electrode guide member $3_1$ can be mounted on the roll 8, by a suitable tool (not shown). The new electrode guide member $3_1$ can be secured to the electrode holder 3 by lowering the rolls 7 together with the piston 5, by delivering high-pressure fluid to the upper side (the chamber $4_2$ of FIG. 4) through a passage (13 of FIG. 4). Then, the linear electrode $1_1$ is brought into engagement with the lower peripheral surface of the electrode guide member $3_1$, by feeding the former along the guide rolls 15 and 16. A suitable automatic feeding means (not shown) can be used for applying the linear electrode $1_1$ to the electrode guide member $3_1$. The electrode $1_1$ on the guide member $3_1$ can be moved to a suitable operative position, relative to the workpiece 2, by moving the electrode holder 3 by a driving mechanism (not shown). As the electrode guide member $3_1$ is rotated by the motor 9 through the idlers 10, 11 and the roll 7, the linear electrode $1_1$ follows the movement of the guide member $3_1$ due to the friction between them, so as to place a fresh portion of the electrode $1_1$ at the operative position facing the work 2. In order to apply a suitable tension to the linear electrode $1_1$, it is possible to bias the reels 17 and 18 in directions opposite to those as shown by arrows in FIG. 7.

With the device of the aforesaid construction, according to the present invention, as the electrode holder 3 vertically reciprocates while passing electric current to the electrode $1_1$ through the electrode guide member $3_1$, a groove can be formed in the workpiece 2. If the electrode holder 3 is driven laterally in the plane of FIG. 7, or in the direction of the X-axis, a curved surface is formed in the workpiece 2. By using a suitable profile or digital control means (not shown) for driving the electrode holder 3 in three-directions, or along X-, Y-, and Z-axes, while feeding electric current to the linear electrode $1_1$ through the electrode guide member $3_1$, a fully automatic three-dimensional discharge-processing device can be achieved.

In the case of the three-dimensional processing, electric discharge takes place not only from the outer or lower surface of the linear electrode $1_1$, but also from the inner or upper surface thereof. Due to the increased electrode consumption caused by such discharge, it is preferable to continuously feed the fresh linear electrode $1_1$ to the operating portion of the guide member $3_1$. It is one of the important features of the invention that such continuous feeding of the fresh linear electrode $1_1$ can be readily done simply by rotating the electrode guide member $3_1$. In order to ensure high accuracy of the processing, the position of the guide member $3_1$, relative to the workpiece 2, can be exactly controlled by the reference point S at the uppermost position of the roll 8. The guide member may or may not be replaced after repeated processing operations. It is also apparent to those skilled in the art that the high accuracy of the discharge current processing can be achieved by using a reference point located at any suitable part of the electrode holder 3, other than the uppermost position of the roll 8. For instance, if the axis O of the guide member $3_1$ is used as a reference, the risk of dimensional error due to the consumption of the inner peripheral surface of the guide member $3_1$, engaging the uppermost position of the roll 8, can completely be eliminated.

In the embodiment of FIGS. 5 to 7, three rolls 7, 7, and 8 are used for rotatably holding the ring-shaped electrode 3 or the electrode guide member $3_1$, but the present invention is not restricted to such arrangement. It should be noted here, however, that if the linear electrode $1_1$ is fed without rotating the guide member $3_1$, due care should be taken not to apply too high a tension to the linear electrode $1_1$, lest it should be broken.

FIG. 9 illustrates an example of a noncircular electrode guide member $3_1$.

FIGS. 10 and 11 show an electrolytic-processing device, embodying the present invention. A ring-shaped electrode $1_2$ is made of the same material as described hereinbefore, referring to FIGS. 1 and 2. The cross section of the ring-shaped electrode $1_2$ can be of any suitable shape, such as a circle or a rectangle. A mounting arm 19 is secured to the upper end of the ring-shaped electrode $1_2$, which is secured to an electrode holder 3 by a suitable means, such as tapered shank or a threaded shank. The lower end of the ring-shaped electrode $1_2$ faces a workpiece 2. A passage 20 is formed in the annular electrode $1_2$, with one end being blocked while the opposite end communicates with the outer end of a flange $19_1$ of the mounting arm 19. The ring-shaped electrode $1_2$ has a plurality of openings 22 communicating the passage 20 with the outside. The open end of the passage 20 at the flange $19_1$ is connected to an outlet 21 of an electrolyte tank (not shown), so that the electrolyte delivered from the tank to the passage 20 is discharged through the openings 22 on the peripheral surface of the ring-shaped electrode $1_2$. In other words, the electrolytic processing with the ring-shaped electrode $1_2$ is carried out while continuously discharging the electrolyte therefrom. In the actual processing operation, it is important to balance the fluid pressure in the electrode $1_2$, which pressure is caused by the electrolyte delivered thereto. In the embodiment of FIG. 10, the electrolyte is fed to the electrode $1_2$ from two diametrically opposing points of the flange $19_1$ of the mounting arm 19 of the electrode, so as to achieve the balance of the fluid pressures applied thereto by the electrolyte.

Referring to FIG. 11, it is desirable to eject the electrolyte only in selected directions. To this end, a plurality of passage sections, e.g., $20_1$, $20_2$, $20_3$, and $20_4$, are formed in the ring-shaped electrode $1_2$, while forming a plurality of openings facing in different directions so as to allow ejection of the electrolyte in selected directions from each of the passage sections, e.g., holes $22_1$, $22_2$, $22_3$, and $22_4$. By using suitable pumps (not shown) and valves (not shown), the direction of the electrolyte ejection can easily be controlled, as can be seen by those skilled in the art. For instance, during the electrolytic processing while moving the ring-shaped electrode $1_2$ at right angles to the plane of FIG. 11, the electrolyte can be delivered only to the passage section $20_1$ for ejecting the electrolyte only through the openings $22_1$.

It is preferable to mount the ring-shaped electrode $1_2$ in the electrode holder 3 in an automatically replaceable manner, by designing the mounting arm 19 so as to be suitable for automatic mounting and dismounting. With such automatic replacing arrangement, the electrolytic-processing device can process workpiece of various shapes under different conditions. A suitable automatic control means (not shown) and auxiliary means (not shown) may be necessary for effectively using such an automated electrolytic-processing device. If the ring-shaped electrode $1_2$ for the electrolytic-processing device is adapted to automatic replacement, the mounting arm 19 should also be adapted to automatic connection and disconnection relative to the outlet 21 of the electrolyte tank.

In order to ensure high accuracy of the electrolytic processing, the ring-shaped electrode $1_2$ should preferably be stationary relative to the vertical axis Z' of the mounting arm 19. Accordingly, the lateral cross section of the mounting arm 19 is preferably noncircular, such as elliptical or polygonal. If the rotation of the ring-shaped electrode $1_2$ about the vertical axis of the electrode, or Z'-axis, is necessary, for instance, to minimize the electrolytic volume of processing in shaping operation of certain special applications, the electrode holder 3 may be rotated about the Z'-axis together with the electrode $1_2$ per se. The rotation of the electrode holder 3 about the Z'-axis can be effected by any suitable means, such as synchro motors and pulse motors.

As described in the foregoing disclosure, according to the present invention, there is providing an improved device for processing a workpiece with electric current, discharging or electrolytic. In the case of electrolytic processing, the electrolyte necessary for the processing can be delivered through the electrode, to ensure reliable supply of the electrolyte. The processing device of the present invention can easily be adapted to fully automatic three-dimensional processing.

Although the present invention has been described with a certain degree of particularity, it is understood that the present disclosure has been made only by way of example and that various modifications in the details of construction and the combination and arrangement of parts may be resorted to without departing from the spirit and the scope of the invention as hereinafter claimed.

What is claimed is:

1. An electric discharge machining device comprising a ring-shaped electrode, means for stationarily holding a workpiece, means for displaceably holding said electrode in a position in which a circumferential surface of said electrode faces the workpiece for machining the same, means for moving said electrode circumferentially in the holding means therefor, and means for moving the electrode holding means relative to said workpiece.

2. A device as claimed in claim 1, wherein said electrode comprises an endlessly connected wire, said means for holding the electrode comprising a holder block member and at least three rolls respectively journaled on said block member for rotation, said rolls being arranged to hold the electrode at a circumferential inner and outer surface thereof.

3. A device as claimed in claim 2, in which said rolls are three in number, one of which is journaled on said block member so as to abut the circumferential inner surface of the electrode ring at the highest level thereof, the other two rolls being journaled on said block member so as to form an equilateral triangle with said one roll and abut the circumferential outer surface of the electrode ring for holding the ring-shaped electrode therebetween, the latter two rolls being raisable for removing the electrode, said means for moving the electrode comprising driving means connected to one of said latter two rolls for circumferentially moving the ring-shaped electrode.

4. A device as claimed in claim 1, wherein said electrode comprises a ring-shaped guide member made of an electrically conductive material and an electrically conductive wire extended over the circumferential outer surface of said ring-shaped guide member.

5. A device as claimed in claim 4, in which said ring-shaped guide member is circular and formed by an endlessly connected wire, which is held by the holding means, the latter comprising a block member and at least three rolls respectively journaled on said block member for rotation, said rolls being arranged to hold said ring-shaped guide member at a circumferential inner and outer surface thereof, said outer surface being provided with a circumferential groove in which said conductive wire extends so as to be moved in either direction accompanied by circumferential movement of said guide member.

6. A device as claimed in claim 4, in which said ring-shaped guide member is noncircular and formed by a body which is fixedly held by the holding means, said guide member having an outer surface provided with a circumferential groove in which said conductive wire extends so as to be slidingly moved thereover by said moving means.

* * * * *